United States Patent
Tochigi

[19]

[11] Patent Number: 6,118,593
[45] Date of Patent: Sep. 12, 2000

[54] ZOOM LENS AND OPTICAL APPARATUS HAVING THE SAME

[75] Inventor: Nobuyuki Tochigi, Kawasaki, Japan

[73] Assignee: Canon Kabushiki Kaisha, Tokyo, Japan

[21] Appl. No.: 09/389,454

[22] Filed: Sep. 3, 1999

[30] Foreign Application Priority Data

Sep. 9, 1998 [JP] Japan .................................. 10-272568

[51] Int. Cl.[7] ................................................... G02B 15/14
[52] U.S. Cl. ............................................. 359/687; 359/686
[58] Field of Search .................................... 359/686, 687, 359/680, 681, 682

[56] References Cited

U.S. PATENT DOCUMENTS

| | | | |
|---|---|---|---|
| 4,859,042 | 8/1989 | Tanaka | 350/423 |
| 5,530,592 | 6/1996 | Tochigi | 359/687 |
| 5,537,255 | 7/1996 | Tochigi | 359/684 |
| 5,612,825 | 3/1997 | Horiuchi et al. | 359/687 |
| 5,712,733 | 1/1998 | Mukaiya | 359/687 |
| 5,847,882 | 12/1998 | Nakayama | 359/684 |
| 5,963,378 | 10/1999 | Tochigi et al. | 359/687 |
| 5,978,153 | 11/1999 | Nishio | 359/690 |
| 6,010,537 | 1/2000 | Konno | 659/389 |

FOREIGN PATENT DOCUMENTS

| | | |
|---|---|---|
| 55-62419 | 5/1980 | Japan . |
| 56-114920 | 9/1981 | Japan . |
| 62-24213 | 2/1987 | Japan . |
| 62-206516 | 9/1987 | Japan . |
| 62-215225 | 9/1987 | Japan . |
| 62-247316 | 10/1988 | Japan . |
| 3-200113 | 1/1991 | Japan . |
| 3-158813 | 7/1991 | Japan . |
| 3-215810 | 9/1991 | Japan . |
| 4-43311 | 2/1992 | Japan . |
| 4-153615 | 5/1992 | Japan . |
| 4-242707 | 8/1992 | Japan . |
| 4-343313 | 11/1992 | Japan . |
| 5-19165 | 1/1993 | Japan . |
| 5-27167 | 2/1993 | Japan . |
| 5-60973 | 3/1993 | Japan . |
| 5-60974 | 3/1993 | Japan . |
| 5-297275 | 11/1993 | Japan . |
| 8-5913 | 1/1996 | Japan . |
| 8-82743 | 3/1996 | Japan . |
| 8-190051 | 7/1996 | Japan . |
| 8-201695 | 8/1996 | Japan . |
| 9-21954 | 1/1997 | Japan . |

*Primary Examiner*—Georgia Epps
*Assistant Examiner*—Michael A. Lucas
*Attorney, Agent, or Firm*—Fitzpatrick, Cella, Harper Scinto

[57] ABSTRACT

A zoom lens of the rear-focus type includes, in order from an object side to an image side, a first lens unit of positive refractive power, a second lens unit of negative refractive power, a third lens unit of positive refractive power and a fourth lens unit of positive refractive power. The variation of magnification from a wide-angle end to a telephoto end is effected by moving the second lens unit toward the image side. Shifting of an image plane caused by the variation of magnification is compensated for by moving the fourth lens unit. Focusing is effected by moving the fourth lens unit. The second lens unit consists of, in order from the object side to the image side, a negative lens, a negative lens, a positive lens and a negative lens, the third lens unit comprises a plurality of positive lenses and a negative lens, and the fourth lens unit consists of a negative lens and a positive lens, and wherein the following condition is satisfied:

$$0.25 < (Fm-Fw)/(Ft-Fw) < 0.45$$

where Fm is a focal length of the entire zoom lens in a position where the fourth lens unit has moved a maximum distance during the variation of magnification with focusing on an infinitely distant object, Fw is a focal length of the entire zoom lens at the wide-angle end, and Ft is a focal length of the entire zoom lens in the telephoto end.

7 Claims, 7 Drawing Sheets

FIG. 1

FIG. 2A
Fno/1.65

-0.05    0.05
SPHERICAL
ABERRATION

FIG. 2B
2ω=63°

-0.05    0.05
ASTIGMATISM

FIG. 2C
2ω=63°

-5.00    5.00
DISTORTION(%)

FIG. 3A  Fno/3.96
FIG. 3B  2ω=2.2°
FIG. 3C  2ω=2.2°

-0.05  0.05
SPHERICAL ABERRATION

-0.05  0.05
ASTIGMATISM

-5.00  5.00
DISTORTION(%)

FIG. 9A
Fno/3.90

-0.05  0.05
SPHERICAL ABERRATION

FIG. 9B
2ω=2.3°

-0.05  0.05
ASTIGMATISM

FIG. 9C
2ω=2.3°

-5.00  5.00
DISTORTION(%)

ZOOM LENS AND OPTICAL APPARATUS HAVING THE SAME

BACKGROUND OF THE INVENTION

1. Field of the Invention

The present invention relates to zoom lenses and, more particularly, to a zoom lens of the rear focus type having a long back-focal distance for use in film cameras or image pickup apparatus, such as video cameras or broadcasting cameras, while still permitting the relative aperture to be made as large as 1.6 in F-number in the wide-angle end and the range to be extended to as high as 30.

2. Description of Related Art

Recently, home video cameras and the like have reduced their sizes and weights. Along with this there is seen a remarkable advance even in the improvements of the compact form of the zoom lens for the image pickup apparatus. In particular, efforts are being devoted to shortening of the total length of the complete lens, to a reduction of the diameter of the front lens members and to simplification of the configuration.

As one means for achieving these ends, there is known the so-called rear-focus type of zoom lens in which a lens unit other than the front or first one is moved for focusing purposes.

In general, the zoom lenses of the rear focus type have features, as compared with the zoom lens of a type in which the first lens unit is moved to effect focusing, that the first lens unit becomes smaller in effective diameter, making it easier to improve the compact form of the entire lens system, and also that closeup photography, particularly, super-short focusing, becomes easier to do. Further, because the focusing lens unit is relatively small in size and light in weight, a much weaker torque suffices for driving the focusing lens unit. Accordingly, rapid focus adjustment can be performed.

Such a zoom lens of the rear focus type, as disclosed in, for example, Japanese Laid-Open Patent Applications No. Sho 62-215225 (corresponding to U.S. Pat. No. 4,859,042), No. Sho 62-206516, No. Sho 62-24213 (corresponding to U.S. Pat. No. 4,859,042), No. Sho 62-247316, and No. Hei 4-43311, comprises, in order from an object side to an image side, a first lens unit of positive refractive power, a second lens unit of negative refractive power, a third lens unit of positive refractive power and a fourth lens unit of positive refractive power, totaling four lens units, wherein the second lens unit axially moves to vary the focal length, while simultaneously moving the fourth lens unit to compensate for the image shift resulting from the variation of magnification and to effect focusing.

Also, in Japanese Laid-Open Patent Applications No. Hei 4-43311, No. Hei 4-153615, No. Hei 5-19165, No. Hei 5-27167 and No. Hei 5-60973, the fourth lens unit is constructed with one or two positive lenses, so that a zoom lens of short total length is proposed. In Japanese Laid-Open Patent Application No. Hei 5-60974, there is proposed a zoom lens in which the fourth lens unit is constructed with a positive lens and a negative lens, totaling two lenses.

In Japanese Laid-Open Patent Applications No. Sho 55-62419, No. Sho 62-24213, No. Sho 62-215225, No. Sho 56-114920, No. Hei 3-200113, No. Hei 4-242707, No. Hei 4-343313 and No. Hei 5-297275, there are disclosed, in the embodiments thereof, zoom lenses whose third and fourth lens units each are comprised of a positive lens and a negative lens, totaling two lenses.

Further, in Japanese Laid-Open Patent Application No. Hei 3-158813, similarly, there is disclosed a zoom lens comprising, in order from an object side to an image side, a positive first lens unit, a negative second lens unit, a positive third lens unit and a positive fourth lens unit, in which the second and third lens units are axially moved, while varying the air separation therebetween, to vary the focal length continuously, and a stop is positioned in the space either between the second and third lens units or between the third and fourth lens units and is made movable in unison with the third lens unit.

According to the specification of the above Japanese Laid-Open Patent Application No. Hei 3-158813, it is suggested that, during zooming from the wide-angle end to the telephoto end, the air separation between the second and third lens units decreases. Also, in the embodiments thereof, the third lens unit having the aperture stop takes, in the wide-angle end, a position closest to the image side. Thus, at the wide-angle end or a slightly zoomed position therefrom, where the front lens members admit of a light beam of largest diameter, that neighborhood of the third lens unit which contains the stop is located closest to the image side. The entrance pupil is, therefore, brought to a deep position.

As a result, the zoom lens disclosed in the above Japanese Laid-Open Patent Application No. Hei 3-158813 is disadvantageous at reducing the diameter of the front lens members. Also, the distortion for the wide-angle end becomes large. Accordingly, there is a drawback that it is difficult to extend the range to an ultra high value in good performance while removing the large distortion.

In view of the above examples, there have been proposed a variety of zoom lenses. For example, in Japanese Laid-Open Patent Application No. 3-215810, a zoom lens of the rear-focus type is proposed, comprising, in order from an object side to an image side, a first lens unit of positive refractive power, a second lens unit of negative refractive power, a stop, a third lens unit of positive refractive power and a fourth lens unit of positive refractive power, totaling four lens units, in which, during zooming from the wide-angle end to the telephoto end, the second lens unit moves toward the image side, while simultaneously moving the stop and the third and fourth lens units in differential relation with their respective loci each being convex toward the object side, and the fourth lens unit is made movable for focusing.

Further, in Japanese Laid-Open Patent Application No. Hei 8-82743, a zoom lens of the rear-focus type having a high range as much as 20 is proposed, comprising, in order from an object side to an image side, a first lens unit of positive refractive power, a second lens unit of negative refractive power, a third lens unit of positive refractive power having a stop and a fourth lens unit of positive refractive power, totaling four lens units. During zooming from the wide-angle end to the telephoto end, the second lens unit moves toward the image side, while simultaneously moving the stop and the third lens unit in fixed relation with their locus being convex toward the object side and moving the fourth lens unit in a locus convex toward the object side. Focusing is performed by moving the fourth lens unit.

Further, in Japanese Laid-Open Patent Applications No. Hei 8-5913 (corresponding to U.S. Pat. No. 5,847,882) and No. Hei 8-190051 (corresponding to U.S. Pat. No. 5,847,882), five-unit zoom lenses of the rear focus type whose range is about 20 are proposed, comprising, in order from an object side to an image side, a first lens unit of positive refractive power stationary during zooming, a second lens unit of negative refractive power, a third lens unit of positive refractive power, a fourth lens unit of negative refractive power and a fifth lens unit of positive refractive power stationary during zooming. At least the second and fourth lens units move to effect zooming. The fourth lens unit moves to effect focusing.

Further, in Japanese Laid-Open Patent Applications No. Hei 8-201695 (corresponding to U.S. Pat. No. 5,712,733) and No. Hei 9-21954, four-unit zoom lenses of the rear-focus type are proposed, comprising, in order from an object side to an image side, a first lens unit of positive refractive power, a second lens unit of negative refractive power, a third lens unit of positive refractive power and a fourth lens unit of positive refractive power, totaling four lens units. The second lens unit moves toward the image side to vary the focal length from the wide-angle end to the telephoto end. The shift of the image plane with zooming is compensated for by moving the fourth lens unit in a locus convex toward the object side. Focusing is performed by moving the fourth lens unit. The third lens unit has a positive lens and a negative lens of meniscus form convex toward the image side in this order from the object side. The fourth lens unit is comprised of a negative lens of meniscus form convex toward the object side and a positive lens in this order from the object side.

In general, when employing the rear-focus type, a zoom lens is made to have such advantages that the entirety of the lens system is improved in compact form, rapid focusing becomes possible and the minimum object distance is easy to shorten.

However, with the back-focal distance secured so long as to accommodate the optical low-pass filter, color filter and others, on the other hand, if it is intended to minimize the variation of aberrations with focusing or to maintain a high optical performance stable throughout the entire focusing range, the appropriate construction and arrangement of constituent lenses of the zoom lens become very difficult to find.

Particularly, for a zoom lens which has secured a large relative aperture and a high range at once, it becomes very difficult to obtain a high optical performance through the entire zooming range and throughout the entire focusing range.

BRIEF SUMMARY OF THE INVENTION

It is, therefore, an object of the present invention to provide a zoom lens of the rear-focus type which has the large relative aperture and a high range as much as 30 and which maintains good stability of optical performance at a high level throughout the entire zooming range from the wide-angle end to the telephoto end and throughout the entire focusing range from an infinitely distant object to a super close object.

To attain the above object, in accordance with an aspect of the invention, there is provided a zoom lens, comprising, in order from an object side to an image side, a first lens unit of positive refractive power, a second lens unit of negative refractive power, a third lens unit of positive refractive power and a fourth lens unit of positive refractive power, a variation of magnification from a wide-angle end to a telephoto end being effected by moving the second lens unit toward the image side, the shift of an image plane caused by the variation of magnification being compensated for by moving the fourth lens unit, and focusing being effected by moving the fourth lens unit, wherein the second lens unit consists of, in order from the object side to the image side, a negative lens, a negative lens, a positive lens and a negative lens, the third lens unit comprises a plurality of positive lenses and a negative lens, and the fourth lens unit consists of a negative lens and a positive lens, and wherein the following condition is satisfied:

$$0.25 < (Fm-Fw)/(Ft-Fw) < 0.45 \tag{1}$$

where Fm is a focal length of the entire zoom lens in a position where the fourth lens unit has moved a maximum distance during the variation of magnification with focusing on an infinitely distant object, Fw is a focal length of the entire zoom lens at the wide-angle end, and Ft is a focal length of the entire zoom lens at the telephoto end.

The above and further objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

FIG. 1, FIG. 4, FIG. 7 and FIG. 10 in block diagrams show four numerical examples 1 to 4 of the rear-focus type zoom lens according to the invention. FIGS. 2A to 2C and FIGS. 3A to 3C graphically show the aberrations at the wide-angle end and the telephoto end, respectively, of the zoom lens of the numerical example 1. FIGS. 5A to 5C and FIGS. 6A to 6C show the aberrations at the wide-angle end and the telephoto end, respectively, of the zoom lens of the numerical example 2. FIGS. 8A to 8C and FIGS. 9A to 9C show the aberrations at the wide-angle end and the telephoto end, respectively, of the zoom lens of the numerical example 3. FIGS. 11A to 11C and FIGS. 12A to 12C show the aberrations in the wide-angle end and the telephoto end, respectively, of the zoom lens of the numerical example 4.

Referring to FIGS. 1, 4, 7 and 10, the zoom lens comprises, in order from an object side to an image side, a first lens unit L1 of positive refractive power, a second lens unit L2 of negative refractive power, a third lens unit L3 of positive refractive power and a fourth lens unit L4 of positive refractive power. An aperture stop SP is disposed in front of the third lens unit L3.

A face plate, filters and others in a glass block G are, if necessary, provided in front of an image plane IP, in which an image pickup element, such as a CCD, is located.

In the present embodiments, during zooming from the wide-angle end to the telephoto end, the second lens unit axially moves toward the image side as indicated by the arrow. The shift of the image plane caused by the zooming is compensated for by moving a part or the whole of the fourth lens unit (in the present embodiments, the whole) in a locus convex toward the object side.

Also, for focusing purposes, a part or the whole of the fourth lens unit axially moves (in the present embodiments, the whole). That is, the rear focus type lens is employed. With an object at infinity or at the minimum object distance, during zooming from the wide-angle end to the telephoto end, the fourth lens unit moves in the locus indicated by a solid line curve 4a or a dashed line curve 4b, respectively, in FIGS. 1, 4, 7 and 10. Incidentally, the first and third lens units remain stationary during zooming and during focusing.

In the present embodiments, the compensating provision for the image shift and the focusing provision are both made in a common lens unit, say, the fourth lens unit.

In particular, as shown by the curves 4a and 4b in FIGS. 1, 4, 7 and 10, the locus of movement of the fourth lens unit is made convex toward the object side, thereby assuring efficient utilization of the space between the third and fourth lens units. A shortening of the total length of the complete zoom lens is thus advantageously achieved.

In the present embodiments, at the setting in, for example, the telephoto end, during focusing from an infinitely distant object to an object at the minimum distance, the fourth lens unit moves forward as indicated by a straight line 4c in FIGS. 1, 4, 7 and 10.

In the present embodiments, the second lens unit L2 is composed of, in order from the object side to the image side, a negative lens of meniscus form convex toward the object side, a negative lens of bi-concave form, a positive lens of bi-convex form and a negative lens having a concave surface facing the object side. This arrangement brings the front principal point of the second lens unit toward the first lens unit, thereby reducing the interval between the principal points of the first and second lens units. Improvements of the compact form of the entire lens system are thus assured. Another advantage is to minimize the range of variation of chromatic aberrations with zooming.

Further, the third lens unit L3 is composed of two positive lenses of bi-convex form and a negative lens having a concave surface facing the object side. Also, the fourth lens unit L4 is constructed with a cemented lens composed of a negative lens of meniscus form convex toward the object side and a positive lens of bi-convex form.

In addition, where Fm is a focal length of the entire zoom lens in a position where the fourth lens unit has moved a maximum distance during zooming with focusing on an infinitely distant object, Fw is a focal length of the entire zoom lens at the wide-angle end, and Ft is a focal length of the entire zoom lens at the telephoto end, and the zoom lens is made to satisfy the above-described condition (1).

According to the above arrangement, a zoom lens of the rear-focus type having a high range as much as 30 is obtained without causing the size of the entire lens system from unduly increasing, while still permitting good optical performance to be maintained stable throughout the entire zooming range from the wide-angle end to the telephoto end and throughout the entire focusing range.

The technical significance of the above-described condition (1) is next explained. The condition (1) is concerned with the zooming movement of the fourth lens unit and has an aim to improve the compact form of the entire lens system, while still maintaining an increase of the performance to be achieved. When the lower limit of the condition (1) is exceeded, as this implies that the focal length Fm is too short, the required total movement for the adequate zoom ratio of the second lens unit becomes large, causing the size of the entire lens system to increase greatly.

On the other hand, when the upper limit of the condition (1) is exceeded, i.e., when the focal length Fm is too long, the amount of movement of the fourth lens unit becomes too large in the neighborhood of the telephoto end, so that the movement of the fourth lens unit becomes difficult to control, giving rise to a problem of increasing the variation of aberrations with zooming.

In the present embodiments, the form and the construction and arrangement of the constituent lenses of the zoom lens are determined as described above. Thereby, despite as high a zoom ratio as 30, a high optical performance is obtained throughout the entire zooming range and throughout the entire focusing range.

Further, in the rear-focus type zoom lens according to the invention, there is room for further improvements of the optical performance. So, it is preferable to satisfy at least one of the following features or conditions.

(a) The third lens unit and/or the fourth lens unit each have at least one aspheric surface.

In the present embodiments, by providing the aspheric surface to the third and/or fourth lens unit through which the on-axial light beam passes at a high position at the wide-angle end, the variation with zooming of spherical aberration, coma flare of higher orders and comatic aberrations is corrected well regardless of reducing the number of lens elements.

(b) Where fi is a focal length of the i-th lens unit, and D34t is a separation between the third lens unit and the fourth lens unit at the telephoto end with focusing on an infinitely distant object, the following conditions are satisfied:

$$-8.5 < f1/f2 < -7.0 \quad (2)$$

$$0.1 < D34t/Ft < 0.2 \quad (3)$$

The condition (2) is concerned with the ratio of the focal lengths of the first and second lens units and has an aim to simultaneously fulfill the requirements of, despite the high range, achieving improvements of the compact form and of elongating the back-focal distance, while still maintaining good optical performance. When the lower limit of the condition (2) is exceeded, as this means that the focal length f2 of the second lens unit is too long and the focal length f1 of the first lens unit is too short, the total zooming movement of the second lens unit is increased so greatly that the total length of the complete lens and the diameter of the front lens members become difficult to minimize.

Such a violation also causes an increase of the movement of the fourth lens unit in the telephoto region. So, another problem even arises in that the aberrations vary to a larger extent with zooming. Conversely, when the upper limit of the condition (2) is exceeded, distortion and other aberrations become difficult to correct well.

The condition (3) is concerned with the axial separation between the third and fourth lens units in the telephoto end with an object at infinity. When the separation between the third and fourth lens units is wider than the upper limit, the height of incidence of the off-axial light beam on the fourth lens unit becomes higher, causing an increase in the difficulty of correcting aberrations. Moreover, the effective diameter of the fourth lens unit is caused to increase greatly, thus giving rise to another problem.

Conversely, when the lower limit of the condition (3) is exceeded, as this means that the separation between the third and fourth lens units is too narrow, a problem arises in that the required forward movement for close-up focusing of the fourth lens unit becomes difficult to secure.

(c) As described above, the conditions (1), (2) and (3) suffice for maintaining good stability of optical performance over the high range and for satisfactory improvements of the compact form. For more desired results, it is preferred that the numerical ranges of the conditions (1) to (3) are made even narrower as follows:

$$0.32 < (Fm-Fw)/(Ft-Fw) < 0.41$$

$$-8.0 < f1/f2 < -7.2$$

$$0.12 < D34t/Ft < 0.16$$

(d) In order to minimize the diameter of the front lens members advantageously, the stop is preferably positioned in the most front of the third lens unit. Such an arrangement puts the entrance pupil in a place nearest to (shallowest from) the first lens unit, thus facilitating reduction of the diameter of the first lens unit to a minimum.

(e) In order to minimize the bulk and size of the whole lens system, where fi is a focal length of the i-th lens unit, Fw is a focal length of the entire zoom lens in the wide-angle end, Ft is a focal length of the entire zoom lens at the telephoto end, and N2A is an average refractive index of materials of the negative lenses included in the second lens unit, it is preferred to satisfy at least one of the following conditions:

$$-0.45 < f2/(Fw \times Ft)^{0.5} < -0.25 \quad (4)$$

$$12.0 < f1/Fw < 16.0 \quad (5)$$

$$4.0 < f4/Fw < 6.0 \quad (6)$$

$$1.75 < N2A \quad (7)$$

The condition (4) is concerned with the focal length of the second lens unit. When the lower limit of the condition (4) is exceeded, as this means that the focal length of the second lens unit is too short, the Petzval sum becomes large in the under, so that the declination of the field and other aberrations become difficult to correct. Conversely, when the upper limit of the condition (4) is exceeded, the movement of the second lens unit is increased greatly, giving rise to a problem that the diameter of the front lens members becomes too much large.

The factor in the condition (5) represents the object point for the second lens unit, that is, the magnification. To assure minimization of the size of the entire lens system, it is preferred that the second lens unit takes unity of magnification in the middle of zooming.

If the second lens unit takes unity of magnification in the middle of zooming, the fourth lens unit, during zooming, depicts a locus of motion like an almost complete reciprocation, thus making it possible to obtain the high range with a highest space efficiency. Concretely speaking, when the upper limit of the condition (5) is exceeded, the object point for the second lens unit stands afar off, lowering the image magnification of the second lens unit. Therefore, it becomes difficult to improve the compact form advantageously.

Further, the separation between the first and second lens units is caused to increase. The size of the zoom lens becomes difficult to minimize. When the lower limit of the condition (5) is exceeded, as this means that the magnification of the second lens unit is too large, the increase of the range becomes difficult to achieve, so that the object of the invention cannot be accomplished.

The condition (6) is concerned with the focal length of the fourth lens unit. When the upper limit of the condition (6) is exceeded, the movement of the fourth lens unit is caused to increase, which in turn causes an increase in the range of variation of aberrations with zooming and with focusing. Conversely, when the lower limit of the condition (6) is exceeded, the fourth lens unit gets a higher degree of sensitivity and, therefore, becomes difficult to control. It becomes also difficult to correct aberrations, too, and it becomes difficult to obtain a sufficient back-focal distance.

The condition (7) is concerned with the choice of the materials for the negative lenses in the second lens unit for varying the focal length. To minimize the size, there is need to limit the total zooming movement of the second lens unit to a minimum. For this purpose, the refractive power of the second lens unit must be strengthened. If so, there is a possibility of increasing the negative Petzval sum so greatly as to damage the flatness of the field.

With such a background in mind, the condition (7) is set forth for strengthening the refractive power of the second lens unit, while still keeping good characteristics of the image surface. Therefore, the negative lenses in the second lens unit are made up from materials of appropriate refractive indices to prevent the Petzval sum from increasing.

When the condition (7) is violated, it becomes difficult to correct well the variation of field curvature with zooming.

(f) It will be appreciated from the foregoing that the rules of lens design described above can achieve further improvements of the compact form. However, to facilitate the simultaneous fulfillment of the requirements of, despite the high range, obtaining an improved compact form and of correcting all aberrations well, it is preferred that the factors in the conditions (4) to (7) lie within the following ranges:

$$-0.36 < f2/(Fw \times Ft)^{0.5} < -0.30$$

$$13.2 < f1/Fw < 14.5$$

$$5.0 < f4/Fw < 5.5$$

$$1.77 < N2A$$

Next, four numerical examples 1 to 4 of the invention are shown. In the numerical data for the examples 1 to 4, Ri is the radius of curvature of the i-th surface, when counted from the object side, Di is the i-th optical element thickness or air separation and Ni and vi are respectively the refractive index and Abbe number of the material of the i-th optical element.

In the numerical examples 1 to 4, the last two surfaces define a glass block such as a face plate and filters. The values of the factors in the above-described conditions (1) to (7) for the numerical examples 1 to 4 are listed in Table-1.

The shape of an aspheric surface is expressed in the coordinates with an X axis in the axial direction and an H axis in the direction perpendicular to an optical axis, the direction in which light advances being taken as positive, by the following equation:

$$X = \frac{(1/R)H^2}{1 + \sqrt{1 - (1+K)(H/R)^2}} + BH^4 + CH^6 + DH^8 + EH^{10}$$

where R is the radius of the osculating sphere, and K, B, C, D and E are the aspheric coefficients.

Also, it is to be noted that the notation "e-0X" means "$10^{-X}$".

Numerical Example 1:

f = 1~31.95   Fno = 1.65~3.96   2ω = 63.0°~2.2°

| R1 = 30.575 | D1 = 0.44 | N1 = 1.846660 | v1 = 23.8 |
| R2 = 9.247 | D2 = 0.06 | | |
| R3 = 9.301 | D3 = 1.50 | N2 = 1.603112 | v2 = 60.6 |
| R4 = −78.480 | D4 = 0.05 | | |
| R5 = 9.944 | D5 = 0.82 | N3 = 1.834000 | v3 = 37.2 |
| R6 = 36.274 | D6 = Variable | | |
| R7 = 4.670 | D7 = 0.20 | N4 = 1.772499 | v4 = 49.6 |
| R8 = 1.519 | D8 = 1.02 | | |
| R9 = −5.229 | D9 = 0.17 | N5 = 1.772499 | v5 = 49.6 |
| R10 = 4.735 | D10 = 0.05 | | |
| R11 = 3.086 | D11 = 0.65 | N6 = 1.846660 | v6 = 23.8 |
| R12 = −26.842 | D12 = 0.08 | | |
| R13 = −7.296 | D13 = 0.17 | N7 = 1.882997 | v7 = 40.8 |
| R14 = 348.989 | D14 = Variable | | |
| R15 = Stop | D15 = 0.35 | | |
| R16 = 9.665 | D16 = 0.80 | N8 = 1.583126 | v8 = 59.4 |
| R17 = −6.913 | D17 = 0.05 | | |
| R18 = 8.764 | D18 = 0.62 | N9 = 1.603112 | v9 = 60.6 |
| R19 = −9.686 | D19 = 0.16 | | |
| R20 = −4.597 | D20 = 0.20 | N10 = 1.834807 | v10 = 42.7 |
| R21 = 78.140 | D21 = Variable | | |
| R22 = 3.922 | D22 = 0.17 | N11 = 1.805181 | v11 = 25.4 |
| R23 = 2.273 | D23 = 0.90 | N12 = 1.583126 | v12 = 59.4 |
| R24 = −6.595 | D24 = 1.15 | | |
| R25 = ∞ | D25 = 0.87 | N13 = 1.516330 | v13 = 64.2 |
| R26 = ∞ | | | |

| Variable Separation | Focal Length | | |
| --- | --- | --- | --- |
| | 1.00 | 10.07 | 31.95 |
| D6 | 0.27 | 8.88 | 10.77 |
| D14 | 10.82 | 2.21 | 0.32 |
| D21 | 4.60 | 2.44 | 4.80 |

Aspheric Coefficients:

R16:  K = 2.43687e + 00  B = 1.06494e − 03  C = 1.61941e − 04
      D = −2.06750e − 05  E = 5.70981e − 06
R24:  K = −6.52187e + 00  B = −2.46310e − 04  C = −1.12363e − 04
      D = 1.29821e − 04  E = −6.82885e − 05

Numerical Example 2:

f = 1~31.35   Fno = 1.65~3.70   2ω = 63.0°~2.2°

| R1 = 22.935 | D1 = 0.44 | N1 = 1.846660 | v1 = 23.8 |
| R2 = 9.291 | D2 = 1.50 | N2 = 1.622992 | v2 = 58.2 |
| R3 = −273.258 | D3 = 0.05 | | |
| R4 = 9.603 | D4 = 0.82 | N3 = 1.834807 | v3 = 42.7 |
| R5 = 26.112 | D5 = Variable | | |
| R6 = 4.740 | D6 = 0.20 | N4 = 1.804000 | v4 = 46.6 |
| R7 = 1.527 | D7 = 1.00 | | |
| R8 = −5.294 | D8 = 0.17 | N5 = 1.772499 | v5 = 49.6 |
| R9 = 4.724 | D9 = 0.05 | | |
| R10 = 3.071 | D10 = 0.65 | N6 = 1.846660 | v6 = 23.8 |
| R11 = −19.602 | D11 = 0.11 | | |
| R12 = −6.087 | D12 = 0.17 | N7 = 1.834000 | v7 = 37.2 |
| R13 = 91.367 | D13 = Variable | | |
| R14 = Stop | D14 = 0.35 | | |
| R15 = 9.408 | D15 = 0.80 | N8 = 1.583126 | v8 = 59.4 |
| R16 = −6.767 | D16 = 0.05 | | |
| R17 = 8.654 | D17 = 0.62 | N9 = 1.603112 | v9 = 60.6 |
| R18 = −9.191 | D18 = 0.16 | | |
| R19 = −4.580 | D19 = 0.20 | N10 = 1.834807 | v10 = 42.7 |
| R20 = 67.415 | D20 = Variable | | |
| R21 = 3.920 | D21 = 0.17 | N11 = 1.805181 | v11 = 25.4 |
| R22 = 2.284 | D22 = 0.90 | N12 = 1.583126 | v12 = 59.4 |
| R23 = −6.947 | D23 = 1.15 | | |
| R24 = ∞ | D24 = 0.87 | N13 = 1.516330 | v13 = 64.2 |
| R25 = ∞ | | | |

| Variable Separation | Focal Length | | |
| --- | --- | --- | --- |
| | 1.00 | 11.56 | 31.35 |
| D5 | 0.28 | 8.90 | 10.54 |
| D13 | 10.59 | 1.97 | 0.32 |
| D20 | 4.52 | 2.05 | 4.28 |

Aspheric Coefficients:

R15:  K = 2.53535e + 00  B = 1.02195e − 03  C = 1.50257e − 04
      D = −7.45575e − 06  E = 2.88428e − 06
R23:  K = −6.32967e + 00  B = 1.83073e − 05  C = −6.82268e − 05
      D = 1.20294e − 04  E = −7.19961e − 05

Numerical Example 3:

f = 1~30.04   Fno = 1.65~3.90   2ω = 63.0°~2.3°

| R1 = 22.113 | D1 = 0.44 | N1 = 1.846660 | v1 = 23.8 |
| R2 = 8.814 | D2 = 1.50 | N2 = 1.622992 | v2 = 58.2 |
| R3 = −189.638 | D3 = 0.05 | | |
| R4 = 9.019 | D4 = 0.82 | N3 = 1.834807 | v3 = 42.7 |
| R5 = 24.538 | D5 = Variable | | |
| R6 = 4.772 | D6 = 0.20 | N4 = 1.804000 | v4 = 46.6 |
| R7 = 1.530 | D7 = 1.03 | | |
| R8 = −4.660 | D8 = 0.17 | N5 = 1.696797 | v5 = 55.5 |
| R9 = 4.385 | D9 = 0.05 | | |
| R10 = 3.011 | D10 = 0.65 | N6 = 1.846660 | v6 = 23.8 |
| R11 = −29.069 | D11 = 0.14 | | |
| R12 = −6.157 | D12 = 0.17 | N7 = 1.834000 | v7 = 37.2 |
| R13 = 41.871 | D13 = Variable | | |
| R14 = Stop | D14 = 0.35 | | |
| R15 = 9.782 | D15 = 0.80 | N8 = 1.583126 | v8 = 59.4 |
| R16 = −6.742 | D16 = 0.05 | | |
| R17 = 8.908 | D17 = 0.62 | N9 = 1.603112 | v9 = 60.6 |
| R18 = −9.210 | D18 = 0.15 | | |
| R19 = −4.595 | D19 = 0.20 | N10 = 1.834807 | v10 = 42.7 |
| R20 = 139.182 | D20 = Variable | | |
| R21 = 4.025 | D21 = 0.17 | N11 = 1.805181 | v11 = 25.4 |

-continued

Numerical Example 3:

| R22 = | 2.322 | D22 = 1.00 | N12 = 1.583126 | ν12 = 59.4 |
|---|---|---|---|---|
| R23 = | −6.391 | D23 = 1.15 | | |
| R24 = | ∞ | D24 = 0.88 | N13 = 1.516330 | ν13 = 64.2 |
| R25 = | ∞ | | | |

| Variable | Focal Length | | |
|---|---|---|---|
| Separation | 1.00 | 11.56 | 30.04 |
| D5 | 0.27 | 8.21 | 9.73 |
| D13 | 9.78 | 1.84 | 0.32 |
| D20 | 4.21 | 1.75 | 4.00 |

Aspheric Coefficients:

R15: K = 2.44598e + 00  B = 8.69023e − 04  C = 1.68820e − 04
     D = −8.16971e − 06  E = 2.13455e − 06
R23: K = −6.46142e + 00  B = −5.42052e − 04  C = 2.63913e − 05
     D = 8.71904e − 05  E = −6.81494e − 05

Numerical Example 4:

f = 1~30.33    Fno = 1.65~3.92    2ω = 63.0°~2.3°

| R1 = | 22.442 | D1 = 0.44 | N1 = 1.846660 | ν1 = 23.8 |
|---|---|---|---|---|
| R2 = | 8.771 | D2 = 1.50 | N2 = 1.622992 | ν2 = 58.2 |
| R3 = | −294.493 | D3 = 0.05 | | |
| R4 = | 9.353 | D4 = 0.82 | N3 = 1~882997 | ν3 = 40.8 |
| R5 = | 25.754 | D5 = Variable | | |
| R6 = | 4.404 | D6 = 0.20 | N4 = 1.882997 | ν4 = 40.8 |
| R7 = | 1.611 | D7 = 0.97 | | |
| R8 = | −4.790 | D8 = 0.17 | N5 = 1.693501 | ν5 = 53.2 |
| R9 = | 4.417 | D9 = 0.20 | | |
| R10 = | 3.184 | D10 = 0.65 | N6 = 1.846660 | ν6 = 23.8 |
| R11 = | −9.528 | D11 = 0.09 | | |
| R12 = | −6.009 | D12 = 0.17 | N7 = 1.834000 | ν7 = 37.2 |
| R13 = | 9.338 | D13 = Variable | | |
| R14 = | Stop | D14 = 0.35 | | |
| R15 = | 9.821 | D15 = 0.80 | N8 = 1.583126 | ν8 = 59.4 |
| R16 = | −6.586 | D16 = 0.05 | | |
| R17 = | 9.002 | D17 = 0.62 | N9 = 1.603112 | ν9 = 60.6 |
| R18 = | −8.607 | D18 = 0.14 | | |
| R19 = | −4.676 | D19 = 0.20 | N10 = 1.834807 | ν10 = 42.7 |
| R20 = | 58.562 | D20 = Variable | | |
| R21 = | 4.099 | D21 = 0.17 | N11 = 1.805181 | ν11 = 25.4 |
| R22 = | 2.343 | D22 = 1.00 | N12 = 1.583126 | ν12 = 59.4 |
| R23 = | −6.259 | D23 = 1.15 | | |
| R24 = | ∞ | D24 = 0.87 | N13 = 1.516330 | ν13 = 64.2 |
| R25 = | ∞ | | | |

| Variable | Focal Length | | |
|---|---|---|---|
| separation | 1.00 | 11.38 | 30.33 |
| D5 | 0.27 | 8.28 | 9.80 |
| D13 | 9.82 | 1.82 | 0.30 |
| D20 | 4.43 | 1.97 | 4.20 |

Aspheric Coefficients:

R15: K = 2.04144e + 00  B = 6.86749e − 04  C = 1.57910e − 04
     D = −9.88649e − 06  E = 2.44554e − 06
R23: K = −6.24623e + 00  B = −7.61255e − 04  C = 2.48918e − 05
     D = 8.22867e − 05  E = −6.94856e − 05

TABLE 1

| Condition | Numerical Example | | | |
|---|---|---|---|---|
| No. | 1 | 2 | 3 | 4 |
| (1) | 0.329 | 0.392 | 0.409 | 0.399 |
| (2) | −7.237 | −7.667 | −7.595 | −7.621 |
| (3) | 0.150 | 0.136 | 0.133 | 0.139 |
| (4) | −0.346 | −0.330 | −0.319 | −0.318 |
| (5) | 14.168 | 14.184 | 13.290 | 13.337 |
| (6) | 5.244 | 5.344 | 5.273 | 5.300 |
| (7) | 1.809 | 1.804 | 1.778 | 1.804 |

In view of the employment of the rear-focus type, the rules of design of the zoom lens are set forth as described above. Accordingly, when making the relative aperture as large as 1.6 in F-number and extending the range to as high as 30 in zoom ratio, it is made possible to improve the compact form of the entire zoom lens, while still permitting good optical performance to be maintained stable throughout the entire zooming range from the wide-angle end to the telephoto end and throughout the entire focusing range from an infinitely distance object to a super close object.

Figure 1:
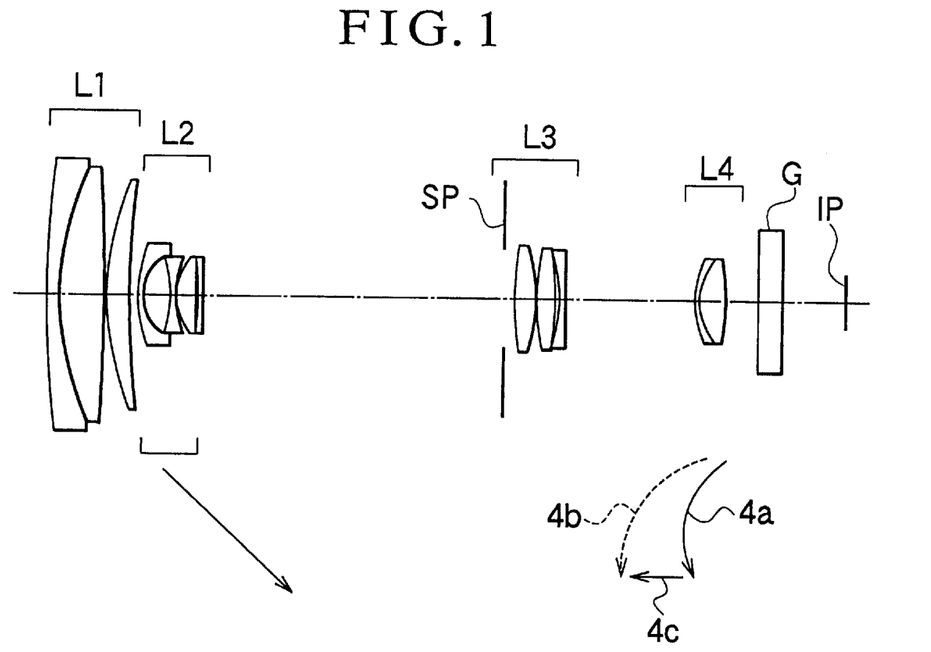
FIG. 1 is a longitudinal section view of a zoom lens according to a numerical example 1.
Figure 2A:
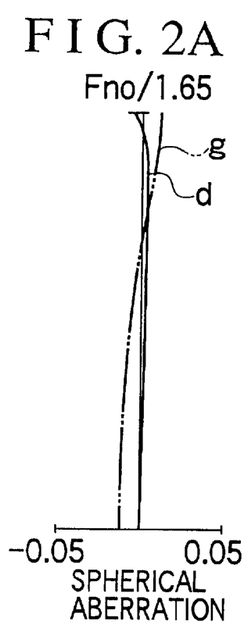
FIGS. 2A to 2C are graphic representations of the aberrations in the wide-angle end of the zoom lens according to the numerical example 1.
Figure 2B:
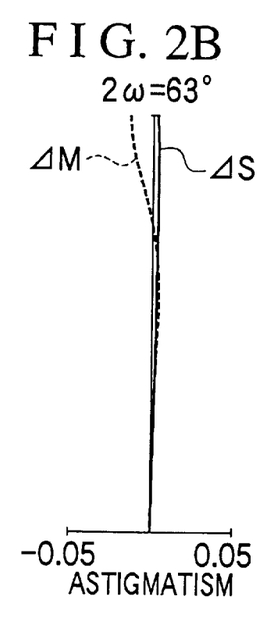
Figure 2C:
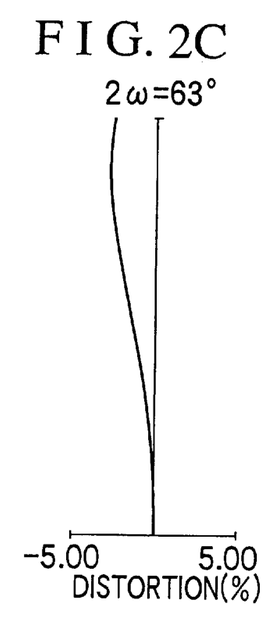
Figures 3A, 3B, 3C:
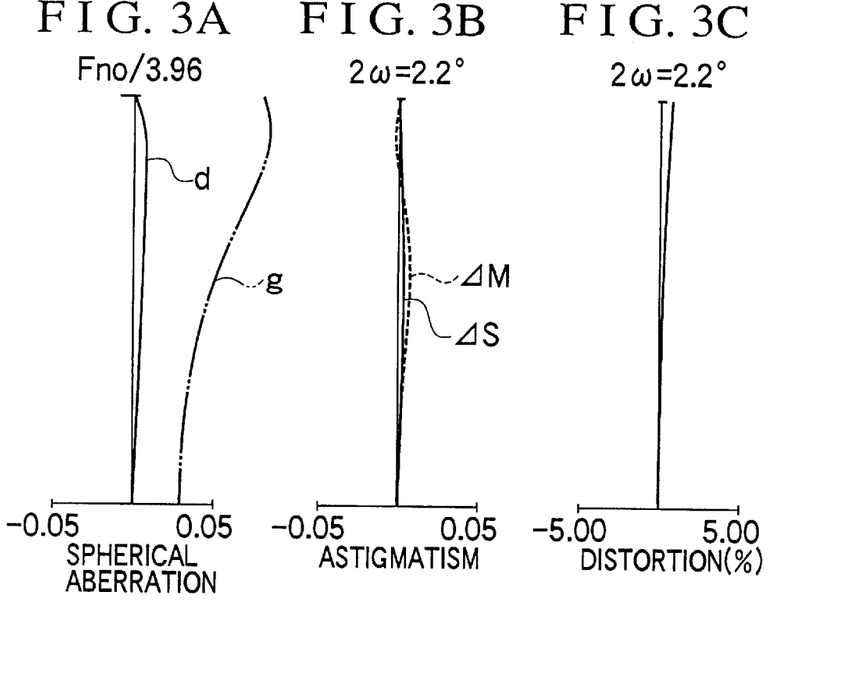
FIGS. 3A to 3C are graphic representations of the aberrations in the telephoto end of the zoom lens according to the numerical example 1.
Figure 4:
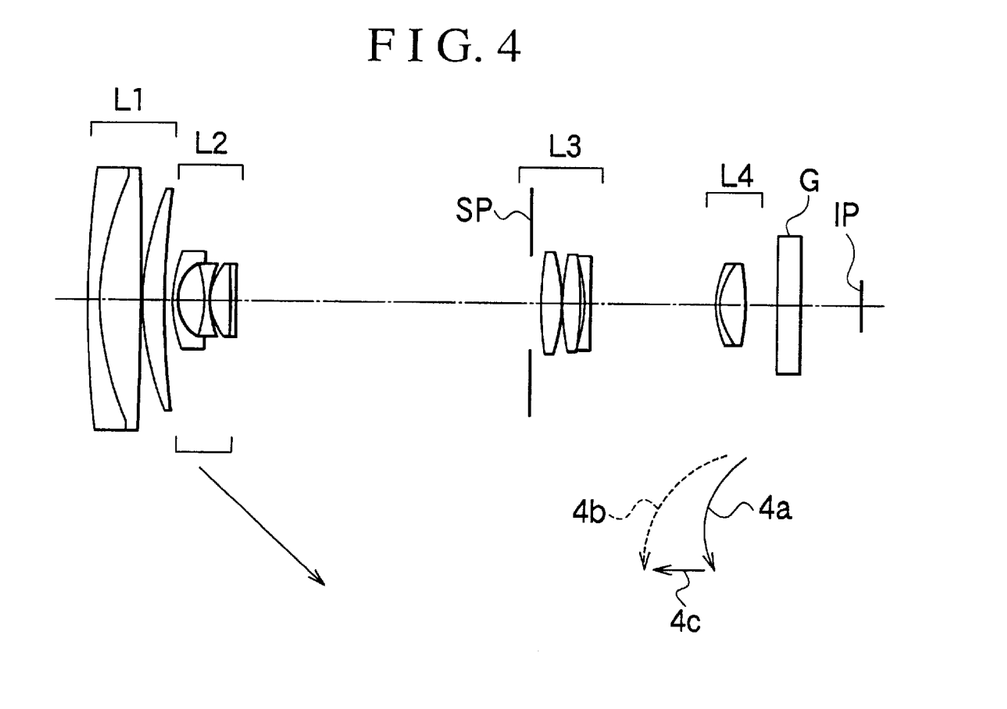
FIG. 4 is a longitudinal section view of a zoom lens according to a numerical example 2.
Figure 5A:
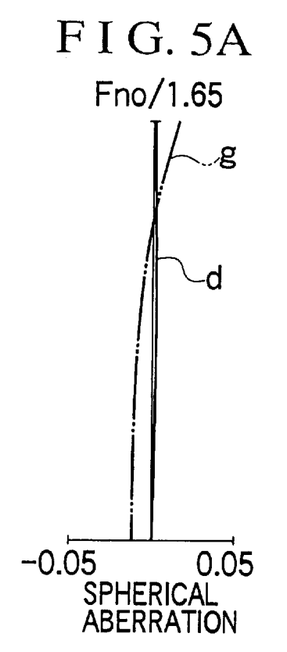
FIGS. 5A to 5C are graphic representations of the aberrations in the wide-angle end of the zoom lens according to the numerical example 2.
Figure 5B:
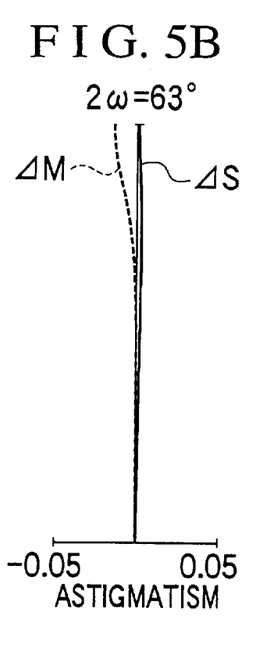
Figure 5C:
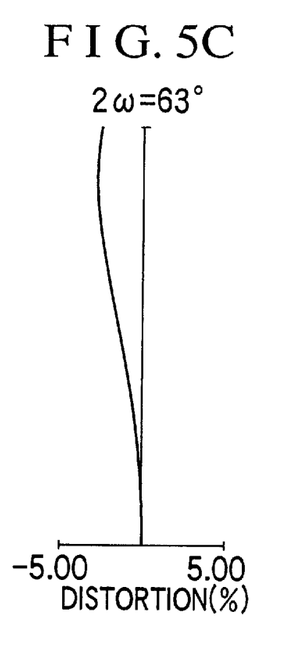
Figure 6A:
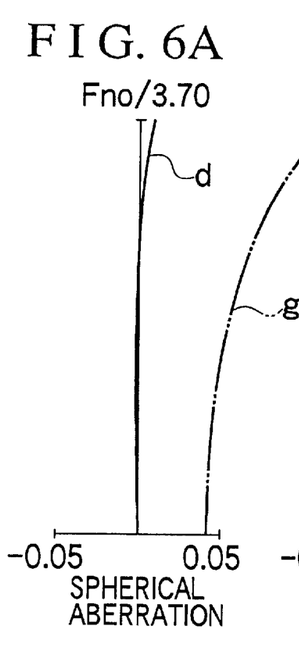
FIGS. 6A to 6C are graphic representations of the aberrations in the telephoto end of the zoom lens according to the numerical example 2.
Figure 6B:
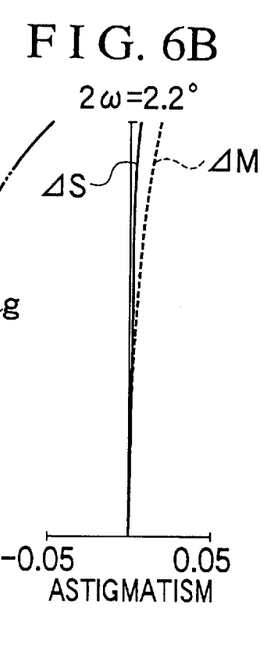
Figure 6C:
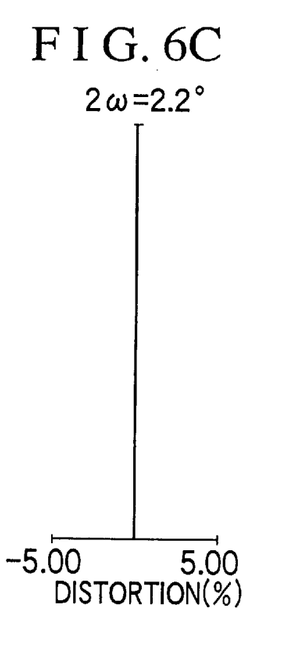
Figure 7:
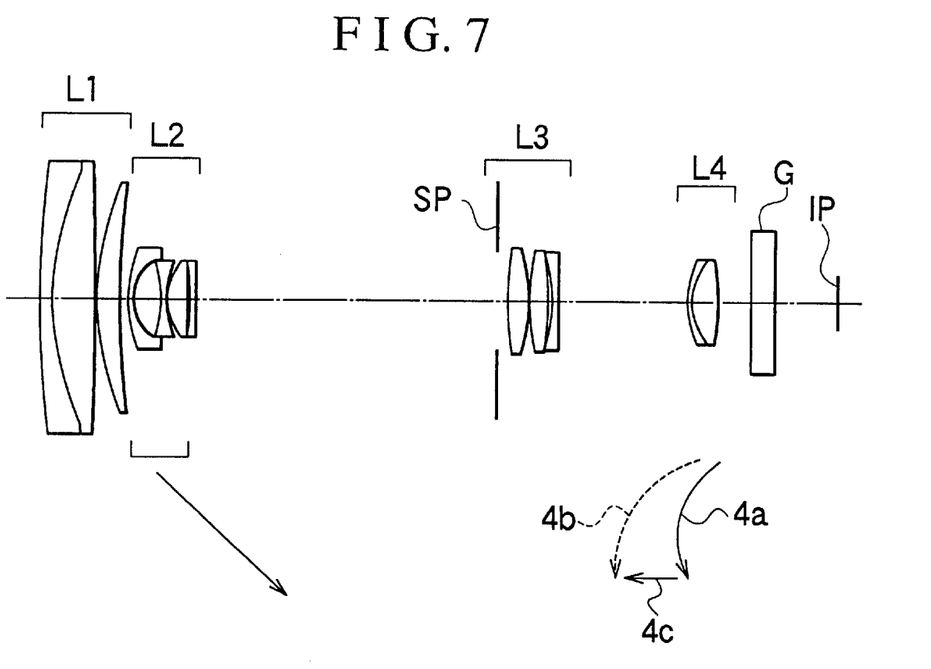
FIG. 7 is a longitudinal section view of a zoom lens according to a numerical example 3.
Figure 8A:
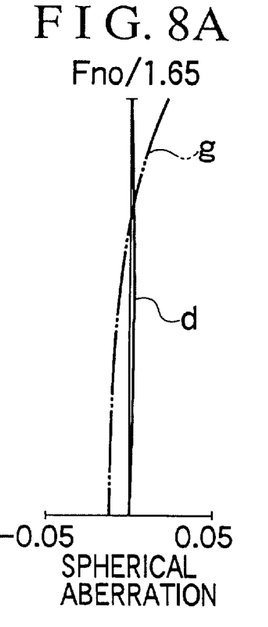
FIGS. 8A to 8C are graphic representations of the aberrations in the wide-angle end of the zoom lens according to the numerical example 3.
Figure 8B:
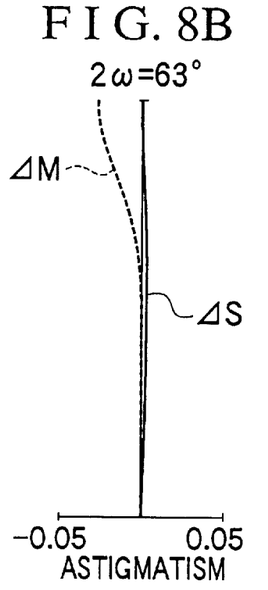
Figure 8C:
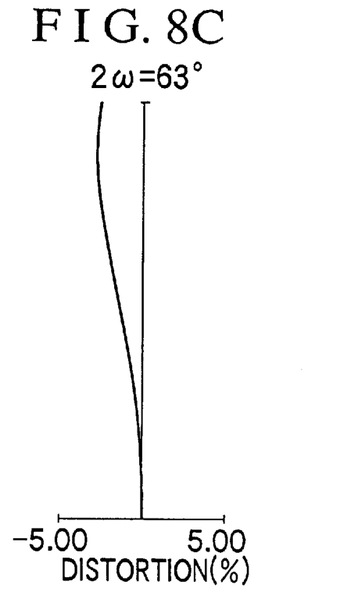
Figure 9A:
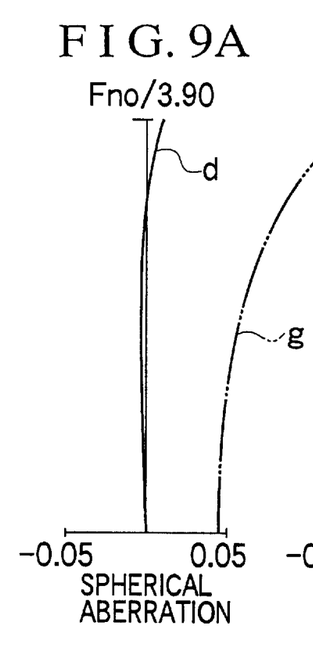
FIGS. 9A to 9C are graphic representations of the aberrations in the telephoto end of the zoom lens according to the numerical example 3.
Figure 9B:
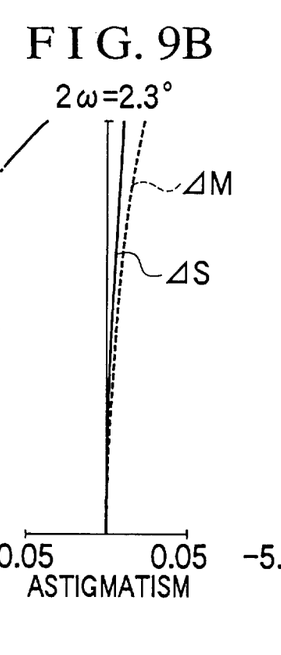
Figure 9C:
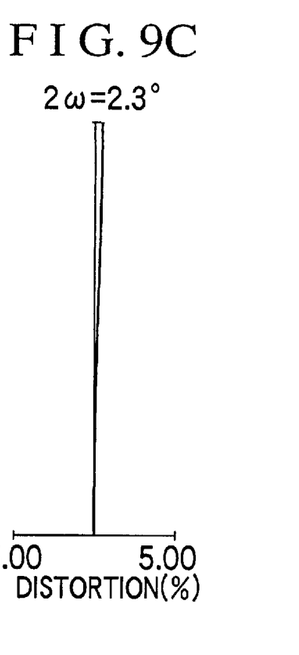
Figure 10:
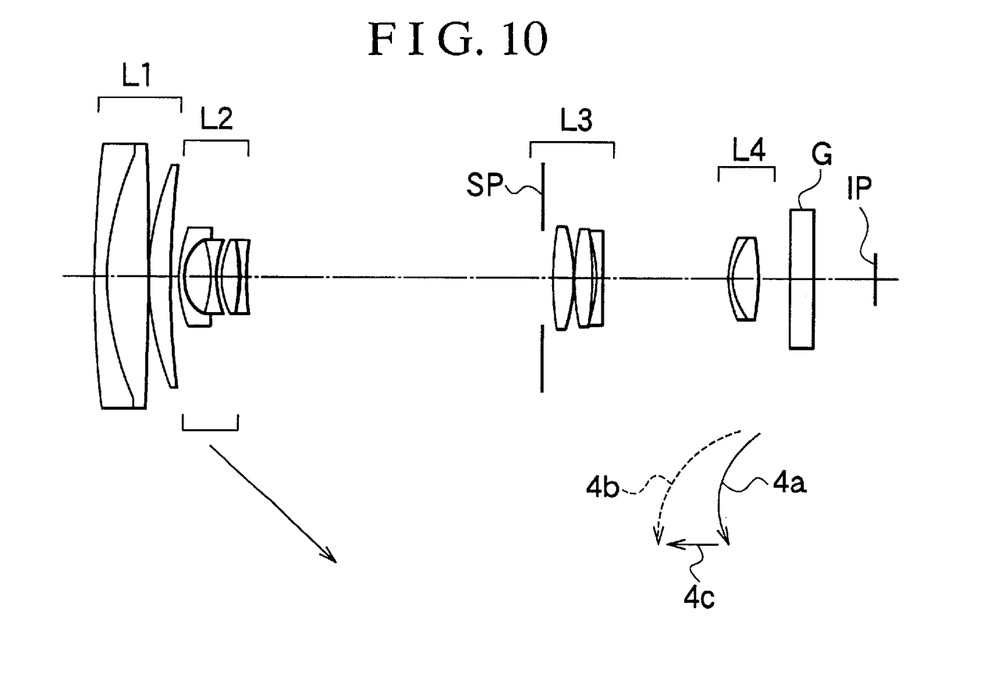
FIG. 10 is a longitudinal section view of a zoom lens according to a numerical example 4.
Figure 11A:
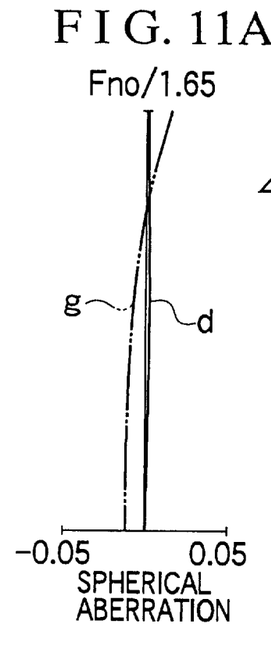
FIGS. 11A to 11C are graphic representations of the aberrations in the wide-angle end of the zoom lens according to the numerical example 4.
Figure 11B:
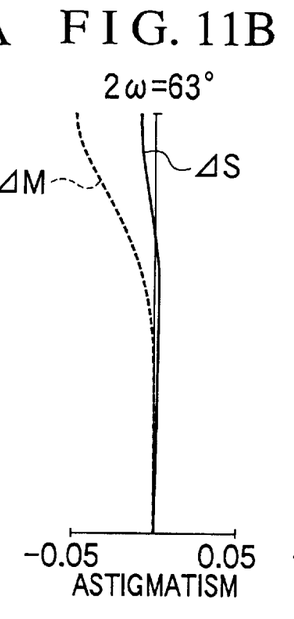
Figure 11C:
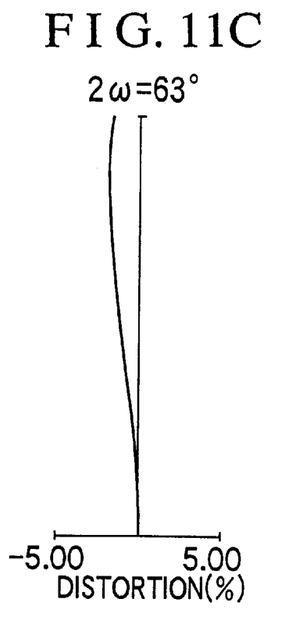
Figures 12A, 12B:
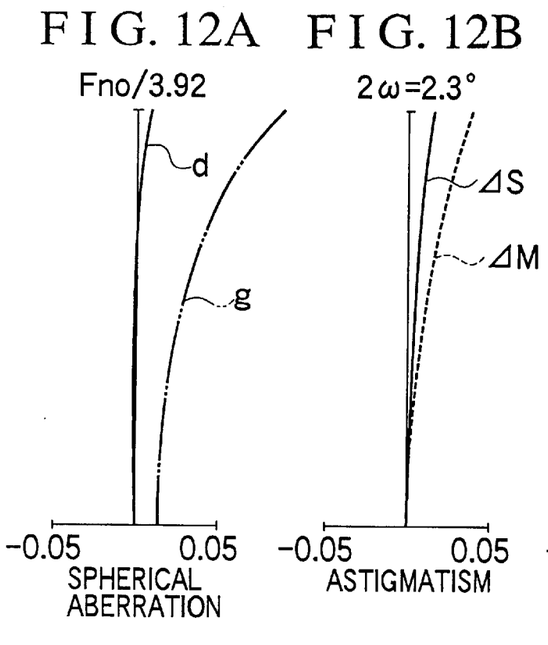
FIGS. 12A to 12C are graphic representations of the aberrations in the telephoto end of the zoom lens according to the numerical example 4.
Figure 12C:
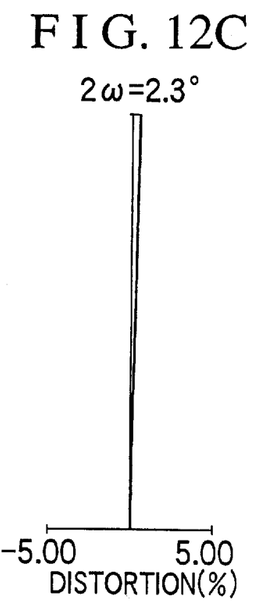
Figure 13:
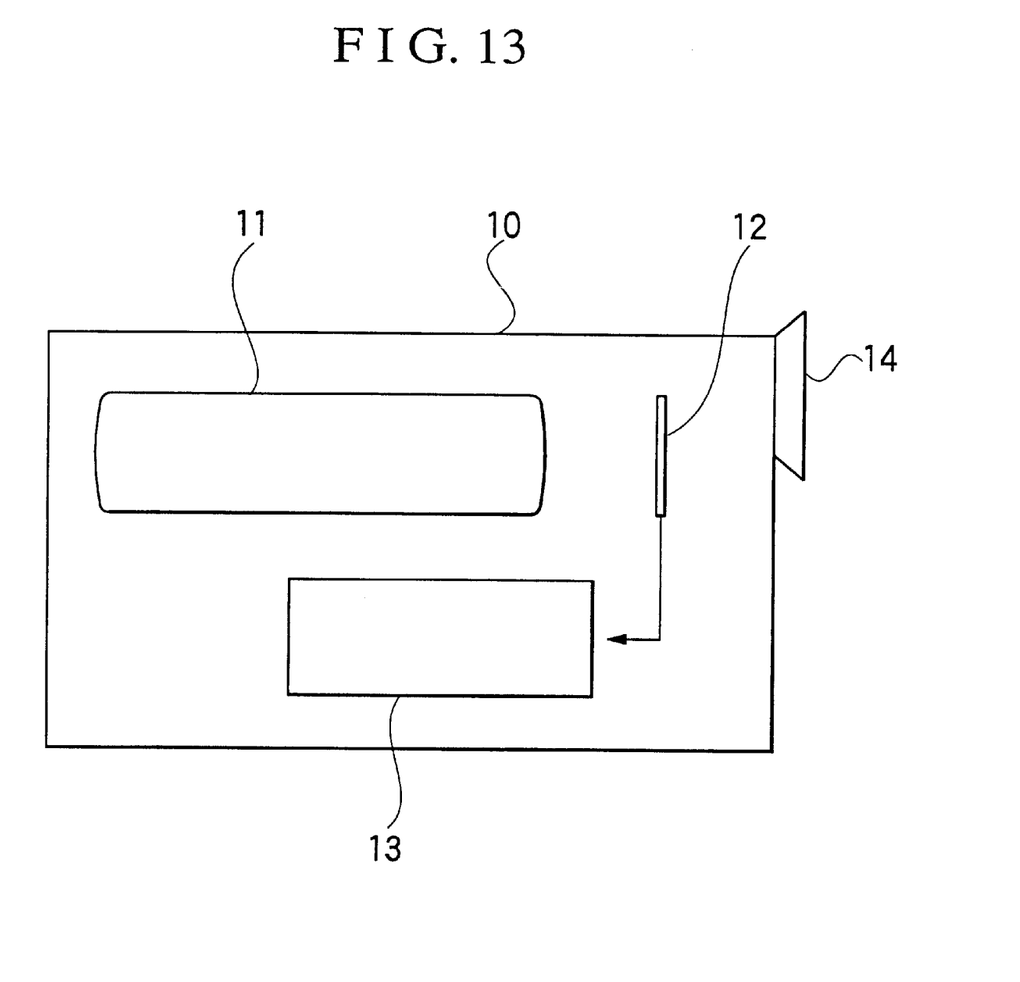
FIG. 13 is a schematic diagram of the main parts of an image pickup apparatus using the zoom lens of any of the numerical examples 1 to 4 as the photographic optical system.

Another embodiment of the invention is described as applied to an image pickup apparatus (video camera) using one of the zoom lenses of the numerical examples 1 to 4 as the photographic optical system, with reference to FIG. 13.

In FIG. 13, reference numeral 10 denotes a body of the image pickup apparatus, reference numeral 11 denotes a photographic optical system formed as the zoom lens of one of the numerical examples 1 to 4, reference numeral 12 denotes an image pickup element such as a CCD arranged to receive an object image formed by the photographic optical system 11, reference numeral 13 denotes recording means for recording the object image received by the image pickup element 12, and reference numeral 14 denotes a viewfinder used for observing the object image. As the viewfinder 14, not only the optical one, but also an electronic type of observing the object image as displayed on the liquid crystal panel can be considered.

In such a manner, the zoom lenses of the numerical examples 1 to 4 are applied to the video camera or like image pickup apparatus. A compact, high-performance image pickup apparatus can thus be realized.

What is claimed is:

1. A zoom lens comprising, in order from an object side to an image side:

a first lens unit of positive optical power;

a second lens unit of negative optical power arranged to move during a variation of magnification, said second lens unit consisting of, in order from the object side to the image side, a negative lens, a negative lens, a positive lens and a negative lens;

a third lens unit of positive optical power, said third lens unit having a plurality of positive lenses and a negative lens; and a fourth lens unit of positive optical power arranged to move during the variation of magnification, said fourth lens unit consisting of a negative lens and a positive lens, and focusing being effected by moving said fourth lens unit, wherein the following condition is satisfied:

$0.25 < (Fm-Fw)/(Ft-Fw) < 0.45$ where Fm is a focal length of the entire zoom lens in a position where said fourth lens unit has moved a maximum distance during the variation of magnification with focusing on an infinitely distant object, Fw is a focal length of the entire zoom lens at a wide-angle end, and Ft is a focal length of the entire zoom lens at a telephoto end.

2. A zoom lens according to claim 1, further satisfying the following conditions:

$$-8.5<f1/f2<-7.0$$

$$0.1<D34t/Ft<0.2$$

where f1 and f2 are focal lengths of said first lens unit and said second lens unit, respectively, and D34t is a separation between said third lens unit and said fourth lens unit at the telephoto end with focusing on an infinitely distant object.

3. A zoom lens according to claim 1, wherein at least one of said third lens unit and said fourth lens unit has an aspherical lens.

4. A zoom lens according to claim 1, further comprising a stop, said stop being disposed on the object side of said third lens unit.

5. A zoom lens according to claim 1, further satisfying at least one of the following conditions:

$$-0.45<f2/(Fw\times Ft)^{0.5}<-0.25$$

$$12.0<f1/Fw<16.0$$

$$4.0<f4/Fw<6.0$$

$$1.75<N2A$$

where f1, f2 and f4 are focal lengths of said first lens unit, said second lens unit and said fourth lens unit, respectively, and N2A is an average refractive index of materials of the negative lenses included in said second lens unit.

6. A zoom lens according to claim 1, wherein, during a variation of magnification from the wide-angle end to the telephoto end, said second lens unit moves toward the image side, said fourth lens unit so moves as to compensate for shift of an image plane caused by the variation of magnification, and said first lens unit and said third lens unit remain stationary.

7. An optical apparatus comprising a zoom lens according to one of claims 1 to 6.

* * * * *

UNITED STATES PATENT AND TRADEMARK OFFICE
CERTIFICATE OF CORRECTION

PATENT NO. : 6,118,593

DATED      : September 12, 2000

INVENTOR(S): TOCHIGI

It is certified that error appears in the above-identified patent and that said Letters Patent is hereby corrected as shown below:

ATTORNEY, AGENT, OR FIRM
"Fitzpatrick, Cella, Harper Scinto" should read
--Fitzpatrick, Cella, Harper and Scinto--

[57] ABSTRACT:
Line 23, "in" should read --at--.

COLUMN 7:
Line 48, "in" should read --at--.

COLUMN 11:
Line 56, "separation" should read --Separation--.

Signed and Sealed this

Eighth Day of May, 2001

Attest:

NICHOLAS P. GODICI

*Attesting Officer*    *Acting Director of the United States Patent and Trademark Office*